(12) United States Patent
Amari

(10) Patent No.: US 6,995,661 B2
(45) Date of Patent: Feb. 7, 2006

(54) VEHICULAR DISPLAY DEVICE

(75) Inventor: Takeyuki Amari, Isehara (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 47 days.

(21) Appl. No.: 10/870,935

(22) Filed: Jun. 21, 2004

(65) Prior Publication Data

US 2005/0001714 A1    Jan. 6, 2005

(30) Foreign Application Priority Data

Jul. 1, 2003    (JP)    ............................ P2003-270036

(51) Int. Cl.
*B60Q 1/00*    (2006.01)
(52) U.S. Cl. ..................... 340/425.5; 345/1.1
(58) Field of Classification Search ............. 340/425.5
See application file for complete search history.

(56) References Cited

U.S. PATENT DOCUMENTS

| | | | |
|---|---|---|---|
| 5,867,133 A * | 2/1999 | Toffolo et al. ................. 345/7 |
| 6,246,935 B1 * | 6/2001 | Buckley ....................... 701/36 |
| 6,402,321 B1 * | 6/2002 | Harter et al. .................. 353/14 |
| 6,690,268 B2 * | 2/2004 | Schofield et al. ........... 340/438 |
| 6,696,931 B2 * | 2/2004 | Paranjpe ..................... 340/436 |
| 6,917,348 B2 * | 7/2005 | Demsky et al. .............. 345/1.1 |

FOREIGN PATENT DOCUMENTS

| | | |
|---|---|---|
| DE | 196 04 351 A1 | 8/1997 |
| DE | 100 56 305 C1 | 1/2002 |
| JP | 11-314538 | 11/1999 |

* cited by examiner

*Primary Examiner*—Jeffery Hofsass
*Assistant Examiner*—George A. Bugg
(74) *Attorney, Agent, or Firm*—McDermott Will & Emery LLP

(57) ABSTRACT

A vehicular display device of the present invention contains a center display mounted on an instrument panel and displaying information, a meter display mounted on an instrument cluster and displaying the information, and a changeover unit switching a display mode of the information between the center display and the meter display in dependence on the degree of secrecy of the information. The vehicular display device can display the information in accordance with the degree of secrecy of the information by taking a matter of protection for personal data into consideration.

8 Claims, 3 Drawing Sheets

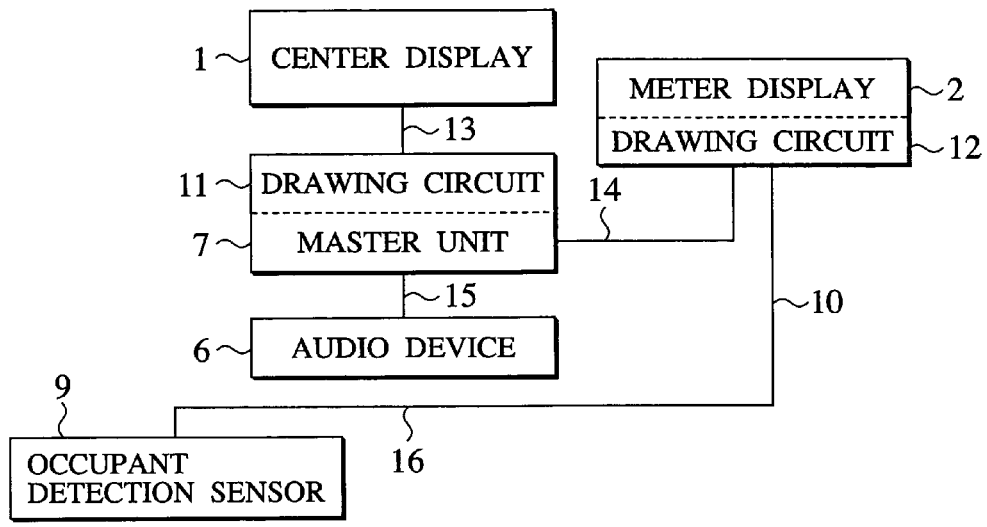

FIG.5
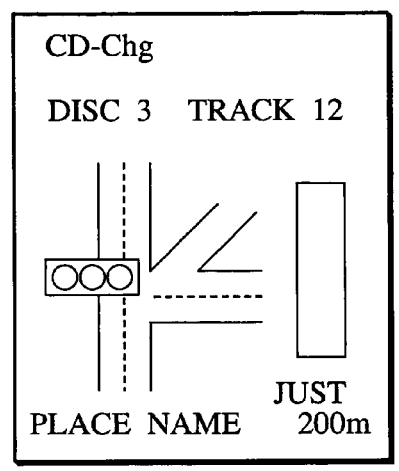
FIG.6A                FIG.6B
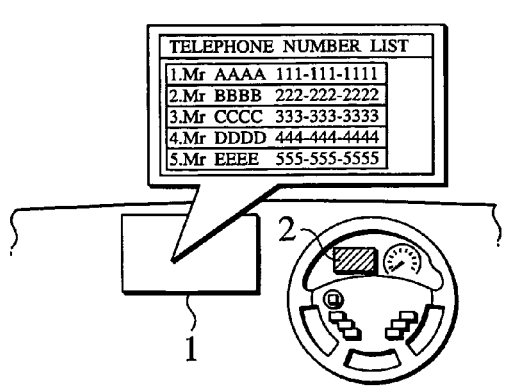 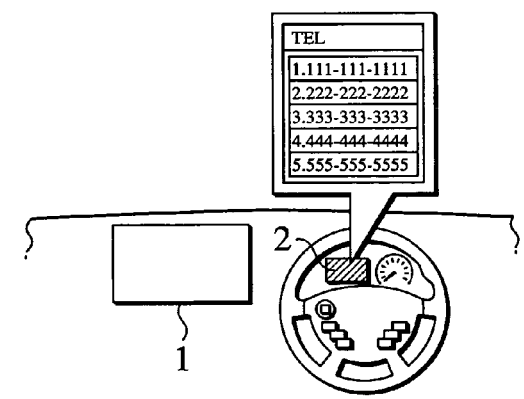

VEHICULAR DISPLAY DEVICE

BACKGROUND OF THE INVENTION

1. Field of the Invention

The present invention relates to a vehicular display device to be mounted on a vehicle for providing a driver of the vehicle with display of a variety of information.

2. Description of the Related Art

Japanese Patent Application Laid-Open No. H11-314538 discloses a vehicular display device for displaying information, indicative of operating conditions of a vehicle, in a visible area depending on an attitude of the driver.

That is, in Japanese Patent Application Laid-Open No. H11-314538, a viewing position estimating section estimates a driver's viewing position based on information resulting from a seat-position acquiring section. On the other hand, a steering-position acquiring section acquires steering-position information. Further, operation is executed to calculate and estimate a driver's visible range based on steering-position information acquired by the steering-position acquiring section, and the driver's viewing position estimated by the viewing position estimating section. Then, information is displayed over a display section such that information is accommodated in the estimated driver's visible range over a meter panel.

SUMMARY OF THE INVENTION

However, in the conventional technology proposed in Japanese Patent Application Laid-Open No. H11-314538, no consideration has been undertaken for protection of personal data during display of personal data provided over the vehicular display device.

It is therefore an object of the present invention to provide a vehicular display device that is able to display information in accordance with the degree of secrecy of information by taking a matter of protection for personal data into consideration.

The first aspect of the present invention provides a vehicular display device comprising: a center display mounted on an instrument panel, the center display displaying information; a meter display mounted on an instrument cluster, the meter display displaying the information; and a changeover unit switching a display mode of the information between the center display and the meter display in dependence on the degree of secrecy of the information.

The second aspect of the present invention provides a vehicular display device comprising: a center display mounted on an instrument panel, the center display displaying information; a meter display mounted on an instrument cluster, the meter display displaying the information; and changeover means for switching a display mode of the information between the center display and the meter display in dependence on the degree of secrecy of the information.

BRIEF DESCRIPTION OF THE DRAWINGS

The invention will now be described with reference to the accompanying drawings wherein;

FIG. 3 is a view illustrating a signal line of the vehicular display device of the embodiment of the present invention;

FIGS. 4A, 4B and 4C are views illustrating display examples of secrete data in the vehicular display device of the embodiment of the present invention;

FIG. 5 is a view illustrating a display example of other data of the vehicular display device of the embodiment of the present invention;

FIG. 6A is a view illustrating a display example of a center display of the vehicular display device of the embodiment of the present invention; and FIG. 6B is a view illustrating a display example of a meter display of the vehicular display device of the embodiment of the present invention.

DETAILED DESCRIPTION OF THE PREFERRED EMBODIMENT

Figure 1:
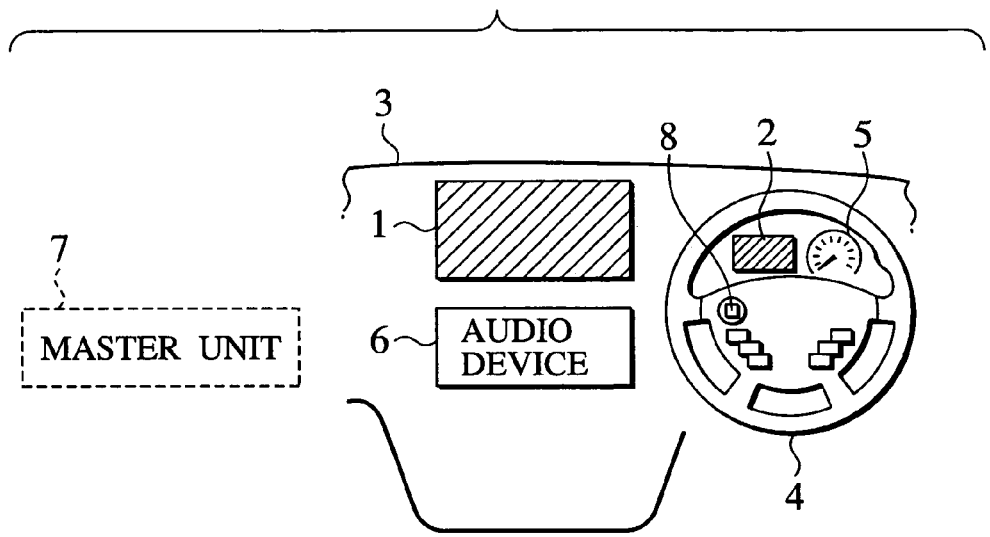
FIG. 1 is a schematic view illustrating a layout of a vehicular display device of an embodiment of the present invention.

Hereinafter, an embodiment of the present invention is described in detail with reference to the attached drawings. Also, throughout the drawings to be described below, those, which have the same function, bear like reference numerals and redundantly repeated description is omitted.

FIG. 1 shows a general outline in a layout of a vehicular display device of the presently filed embodiment of the present invention. As shown in FIG. 1, a vehicle includes a center display 1, a meter display 2, an instrument panel 3, a steering wheel 4, a meter 5, an audio device 6, a master unit 7 and a steering wheel switch 8.

As shown in FIG. 1, with a vehicle on which a navigation system is installed, the center display 1 is located, as a large-scaled display unit of the vehicular display device, on the instrument panel 3 at a central upper area thereof, that is, at an upper part of a cluster lid C. Further, independently from the center display 1, a small-scaled meter display 2 is located on the instrument panel 3 in an area (hereinafter referred to as an instrument cluster) provided with meters, such as the meter 5, which are viewable through a clearance of the steering wheel 4. Also, the instrument cluster includes a lot of displays for various warning lamps specific for a speed meter, a tachometer indicative of engine revolution speed, a fuel gauge, a water temperature gauge, a half-shut-door indicator, a seat belt indicator, a braking indicator and a residual-fuel gauge. For this reason, although the meter display 2 can be located merely in a limited small area, the presence of the meter display 2 located in front of the driver provides an advantage in that the driver has an increased visibility during a drive mode.

Figure 2:
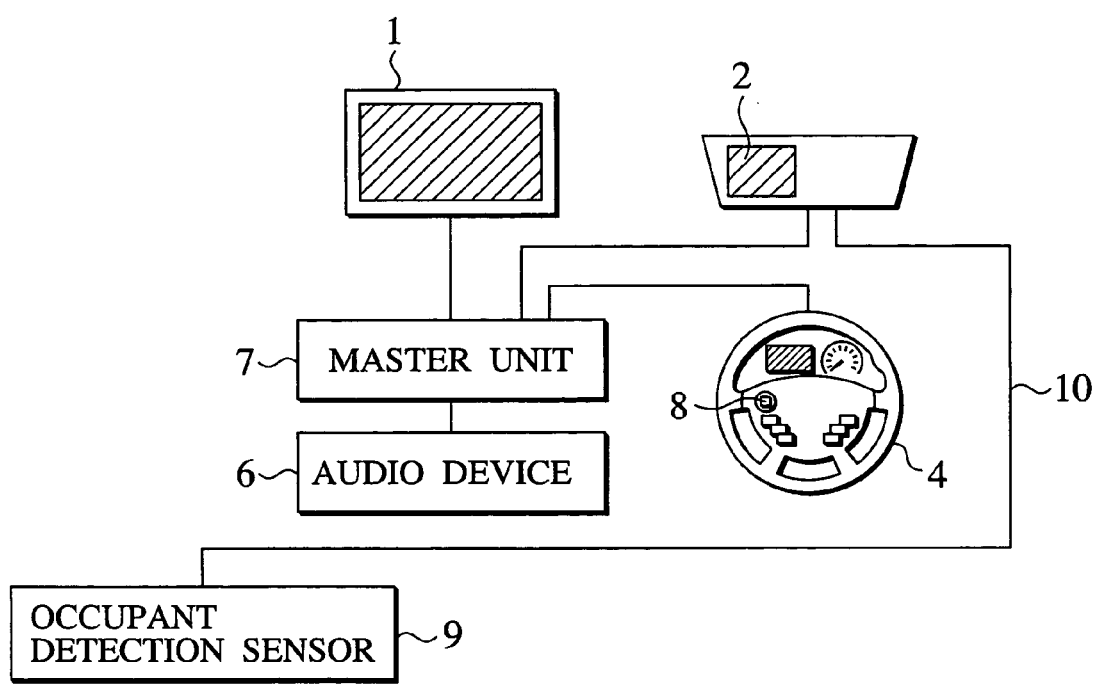
FIG. 2 is a view illustrating a structure of a vehicular display device of the embodiment of the present invention.

FIG. 2 shows an overall system of the vehicular display device of the presently filed embodiment. In FIG. 2, reference numeral 9 designates an occupant detection sensor, and reference numeral 10 designates a signal line. As shown in FIG. 2, the master unit 7, which includes a central processing unit (CPU), a navigation system and a telematics, are connected to the center display 1, the meter display 2, the steering wheel switch 8, the audio device 6 and the occupant detection sensor 9 through a signal line 10. The occupant detection sensor 9 includes a pressure-sensitive type sensor that is located below each seat on which at least an occupant other than the driver takes a rest. Moreover, the steering wheel switch 8 is mounted onto the steering wheel 4 and serves as a switch to enables the driver to manually switch a display mode between the center display 1 and the meter display 2.

FIG. 3 is a block diagram illustrating a signal line of the vehicular display device of the presently filed embodiment. In FIG. 3, reference numeral 11 designates a drawing circuit incorporated in the master unit 7, reference numeral 12 designates a drawing circuit incorporated in the meter display 2, reference numeral 13 designates an image signal, reference numeral 14 designates an information signal, reference numeral 15 designates an audio signal, and reference numeral 16 designates an occupant detection signal.

FIGS. 4A to 4C are schematic views illustrating display examples of secret data involved in the vehicular display device of the presently filed embodiment, and indicate personal data inherent to the driver. Here, data to be kept secrete to the other occupant than the driver will be hereinafter referred to as secrete data. FIGS. 4A and 4B show privacy data. More particularly, in FIG. 4A, privacy data includes a telephone number list owned by the driver and, in FIG. 4B, privacy data includes a mail list received by the driver. FIG. 4C represents security data. More particularly, in FIG. 4C, security data is shown including a code number and a user ID number.

FIG. 5 is a schematic view illustrating a display example of other information to be displayed over the vehicular display device of the presently filed embodiment, and represents one example of a screen displayed over the center display 1. Displayed on the screen in an upper area is audio information of the audio device 6 indicative of the audio device 6 operating in a mode on which a twelfth track of a third disc of a CD charger is reproduced. Also, provided in a major area of the screen below the upper area is a navigation screen representing the rest of the way remaining at a distance of 200 m to a traffic signal.

FIG. 6A shows a display example of the center display 1 of the vehicular display device of the presently filed embodiment. Also, FIG. 6B represents a display example of the meter display 2 of the vehicular display device.

FIG. 6A represents an appearance in which the telephone number list, shown in FIG. 4A, is displayed over the center display 1, and FIG. 6B represents another appearance in which the telephone number list is displayed over the meter display 2.

The center display 1 and the meter display 2 are different in size and resolution of the screen. As shown in FIG. 3, the drawing circuit 11 of the center display 1 is incorporated in the master unit 7. On the other hand, in order for the meter display 2 to provide the driver with vehicle information and navigating information required for the driver during traveling of the vehicle, the meter display 2 incorporates therein the drawing circuit 12. This allows the master unit 7 to transmit the image signal 13, such as a RGB signal, to the center display 1 while permitting the information signal 14 indicative of respective information to be transmitted to the meter display 2. Also, as shown in FIG. 5, other information to be displayed over the center display 1 includes a turn-by-turn display, forming navigating information required for the driver during traveling of the vehicle, and a current status in mode of the audio device 6. Here, the RGB signal means the signal that is created in a subtractive color mixing process to produce a color in combination of the presence or the absence of illumination of three colors, including R (red), G (green) and B (blue), as the three primary colors of light.

The presence of the meter display 2 located in front of the driver provides an advantage of an increased visibility during traveling of the vehicle, and there is a further additional effect that, depending upon the content to be displayed, is expected by the driver. That is, with an increase in IT-related equipments in a market, an issue arises in a method of providing the user with information, such as the telephone number list and mails forming privacy data, and the code number and user ID number that form security data. In an event that the other occupant rides in the vehicle, if personal data, such as privacy data and security data, is displayed over the center display 1, an undesired situation takes place in which such information is rendered available to be viewed by the other occupant. Further, in an event that information is displayed over the meter display 2, the driver is required to view the meter display 2 via the clearance of the steering wheel 4 in a limited range. Hence, only a small-scaled display can be provided which is hard for the driver to view particularly in a case where the driver gets in the vehicle alone with no need for worrying about the other occupant. Furthermore, in contrast, if the driver desires to allow the other occupant to view particular information in a mail that is received, it is rather convenient for such information to be displayed over the center display 1.

With the vehicular display device of the structure set forth above, if the master unit 7 receives a detection signal, representing the absence of the occupant other than the driver, from the occupant detection sensor 9, the telephone number list is displayed over the center display 1 as shown in FIG. 6A. On the contrary, if the master unit 7 receives a detection signal, representing the presence of the occupant other than the driver, from the occupant detection sensor 9, the telephone number list forming secrete data is displayed over the meter display 2. Thus, depending upon the presence of or the absence of the occupant other than the driver, the display mode of information is switched over between the center display 1 and the meter display 2. And, the display examples of secrete data to be switched over include privacy data, such as the telephone number list, and security data such as code number and user ID number, which are shown in FIGS. 4A to 4C. Thus, the master unit 7 responds to the detection signal from the occupant detection sensor 9 indicative of information as to whether the occupant other than the driver gets in the vehicle, and switches the display mode between the center display 1 and the meter display 2 for displaying secrete data.

Further, as shown in FIG. 1, manually operating the steering wheel switch 8, mounted on a steering pad of the steering wheel 4, allows the display mode of information to be switched over between the center display 1 and the meter display 2 according to the will of the driver. It is possible for the driver to operate the steering wheel switch 8 with his visual line remaining in a forward direction.

Thus, the vehicular display device of the presently filed embodiment set forth above includes at least two display units such as the center display 1 and the meter display 2 and, when providing a display of secrete data that is undesired to be caught dead, the occupant detection sensor 9 detects whether the occupant other than the driver gets in the vehicle, thereby permitting the master unit 7 to discriminate whether to provide a display of secrete data over the center display 1 or the meter display 2. If no occupant other than the driver is found in the vehicle, secrete data is displayed over the center display 1 in a large screen, resulting in a capability of providing ease of viewing information. Moreover, if the occupant other than the driver gets in the vehicle, secrete data is displayed over the meter display 2 to provide the driver with display of secrete data without causing the same to be viewed by the occupant other than the driver. Thus, only the driver is able to have a visibility of information which is undesired to be caught dead, making it possible to enhance protection of privacy and security of the driver. Also, the presence of an ability for the driver to manually operate the steering wheel switch 8 provides a capability of arbitrarily switching the display mode and, if it is desired to allow the occupant other than the driver to view particular information, such information can be displayed over the center display 1 to allow all of the occupants to have a visibility.

As set forth above, the vehicular display device of the presently filed embodiment includes the center display 1 and the meter display 2 for displaying information, and includes the master unit 7 (automatic changeover unit) that switches the display mode for display of information between the center display 1 and the meter display 2 in dependence on the degree of secrecy of information. With such a structure, it is possible to provide the display of information depending upon the degree of secrecy by taking protection of personal data into consideration.

Further, the provision of the occupant detection sensor 9 (occupant detection device) that detects the presence of the occupant allows the occupant detection sensor 9 to detect the occupant other than the driver whereupon secrete data is displayed over the meter display 2 by means of the master unit 7 or the steering wheel switch 7. Such structure enables information to be automatically displayed depending upon the degree of secrecy by taking protection of personal information into consideration.

In addition, the vehicular display device includes the manual steering wheel switch 8 (manual changeover unit) by which display of information is switched between the center display 1 and the meter display 2. Such structure enables information to be automatically displayed depending upon the degree of secrecy by taking protection of personal information into consideration.

The entire content of a Japanese Patent Application No. P2003-270036 with a filing date of Jul. 1, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A vehicular display device, comprising:
   a center display mounted on an instrument panel, the center display displaying information;
   a meter display mounted on an instrument cluster, the meter display displaying the information; and
   a changeover unit switching a display mode of the information between the center display and the meter display in dependence on the degree of secrecy of the information.

2. A vehicular display device according to claim 1, further comprising:
   an occupant detection unit detecting an occupant;
   wherein the changeover unit includes an automatic changeover unit that causes secrete data to be automatically displayed over the meter display upon detection of the occupant other than a driver with the occupant detection unit.

3. A vehicular display device according to claim 1,
   wherein the changeover unit includes a manual changeover unit by which the display mode of the information is manually switched over between the center display and the meter display.

4. A vehicular display device according to claim 2, further comprising:
   a manual changeover unit by which the display mode of the information is switched over between the meter display and the center display.

5. A vehicular display device according to claim 2,
   wherein the occupant detection unit includes a pressure sensitive sensor located beneath a seat portion of a seat.

6. A vehicular display device according to claim 1,
   wherein the information includes at least one information selected from audio information, navigating information, a telephone number, a mail, a code number and a user ID.

7. A vehicular display device according to claim 2,
   wherein the secrete data includes at least one data selected from a telephone number, a mail, a code number and a user ID.

8. A vehicular display device, comprising:
   a center display mounted on an instrument panel, the center display displaying information;
   a meter display mounted on an instrument cluster, the meter display displaying the information; and
   changeover means for switching a display mode of the information between the center display and the meter display in dependence on the degree of secrecy of the information.

* * * * *